US006782489B2

(12) United States Patent
Fleming

(10) Patent No.: US 6,782,489 B2
(45) Date of Patent: Aug. 24, 2004

(54) SYSTEM AND METHOD FOR DETECTING PROCESS AND NETWORK FAILURES IN A DISTRIBUTED SYSTEM HAVING MULTIPLE INDEPENDENT NETWORKS

(75) Inventor: Roger A. Fleming, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 476 days.

(21) Appl. No.: 09/833,771

(22) Filed: Apr. 13, 2001

(65) Prior Publication Data

US 2002/0152432 A1 Oct. 17, 2002

(51) Int. Cl.[7] .............................................. G06F 11/00
(52) U.S. Cl. ........................... 714/11; 714/48; 714/55; 714/56
(58) Field of Search ............................. 714/11, 48, 55, 714/56

(56) References Cited

U.S. PATENT DOCUMENTS 5,699,511 A * 12/1997 Porcaro et al. ............... 714/55
5,978,939 A * 11/1999 Mizoguchi et al. ........... 714/55
6,145,103 A * 11/2000 Typaldos et al. ............. 714/55
6,446,225 B1 * 9/2002 Robsman et al. ............. 714/55

* cited by examiner

Primary Examiner—Nadeem Iqbal
Assistant Examiner—Christopher Euripidou

(57) ABSTRACT

The present invention provides a system and method of detecting a process failure and a network failure in a distributed system. The distributed system includes at least two processes, each executing on a host, operable to transmit messages (i.e., heartbeats) to each other on a plurality of networks in the distributed system. A process in the system is operable to execute a network failure algorithm for detecting failure of a network in the system. The process failure algorithm includes calculating a difference in the period of time to receive a heartbeat on a first network from a process and a period of time to receive a heartbeat on a second network from the process. If the difference exceeds a network failure threshold, the second network is suspected of failing. A process in the system is also operable to execute a process failure algorithm. The process failure algorithm includes detecting receipt of a heartbeat from a process on any one of a plurality of networks in the system within a network failure time limit. If a heartbeat is not received on any of the networks, the process is suspected of failing.

21 Claims, 4 Drawing Sheets

SYSTEM AND METHOD FOR DETECTING PROCESS AND NETWORK FAILURES IN A DISTRIBUTED SYSTEM HAVING MULTIPLE INDEPENDENT NETWORKS

The following applications containing related subject matter and filed concurrently with the present application on Apr. 13, 2001, are hereby incorporated by reference: Ser. No. 09/833,650, entitled System and Method for Detecting Process and Network Failures in a Distributed System, Publication No. US 2002/0152431 A1; Ser. No. 09/833,573, entitled Probationary Members, Publication No. US 2002/0161849 A1; and Ser. No. 09/833,572, entitled Adaptive Heartbeats, Publication No. US 2002/0152446 A1.

FIELD OF THE INVENTION

The present invention is generally related to monitoring computer processes in a distributed system. More particularly, the present invention is related to detecting process and network failures in a distributed system.

BACKGROUND OF THE INVENTION

In recent years, reliable, high performance computer systems have been, and still are, in great demand. Users have also demanded the introduction and propagation of multi-processor distributed computer systems to support their computing processes (e.g. simulations, parallel processing, etc.). A distributed computer system generally includes a collection of processes and a collection of execution platforms (i.e., hosts). Each process may be capable of executing on a different host, and collectively, the processes function to provide a computer service. A failure of a critical process in a distributed system may result in the service halting. Therefore, techniques have been implemented for detecting a failure of a process in a timely manner, such that an appropriate action can be taken.

A conventional technique for detecting failure of a process includes the use of heartbeats, which are messages sent between processes at regular intervals of time. According to the heartbeat technique, if a process does not receive a heartbeat from a remote process prior to the expiration of a predetermined length of time, i.e., the heartbeat timeout, the remote process is suspected to have failed. Corrective action, such as eliminating the suspected process, may thus be taken.

A remote process not transmitting a heartbeat may not be an indication of a failure in the remote process. Commonly, a process is connected to a remote process through multiple independent networks on which the heartbeats may be transmitted. Furthermore, not receiving the heartbeat from the remote process may be attributed to a failure of one of the networks communicating the processes, rather than failure of the remote process. For example, a network failure may include a network pause (i.e., a temporary condition that prevents communication on a network) or a less temporary network failure, such as a hardware failure for hardware facilitating transmission on the network. A network pause, for example, can be the result of heavy, high-priority traffic over a network link, sometimes caused by other processes (e.g., remote machine backups). If the network pause endures for a period of time greater than the heartbeat timeout or if a network failure occurs, each process waiting for a heartbeat transmitted over the network in the distributed system may suspect the other processes of failing. Then, unnecessary corrective actions, such as eliminating and/or replacing the suspected process from the system, may be taken, which can cause each service facilitated by the processes in the distributed system to be unnecessarily and temporarily halted. Further, if network failures can be detected, appropriate corrective action could be taken, such as establishing connections between the distributed system processes using alternative paths.

SUMMARY OF THE INVENTION

An aspect of the present invention is to provide a system and method for detecting process and network failures in a distributed system.

In one respect, the present invention includes a system and method for detecting a network failure in a distributed system. A first process in the distributed system is connected to at least one second process in the distributed system via multiple independent networks. If the difference in the period of time for the first process to receive a heartbeat from the second process on a first network and a period of time to receive a heartbeat from the second process on a second network exceeds a network failure threshold, the second network is suspected of failing.

In another respect, the present invention includes a system and method for detecting a process failure in the distributed system. If the first process fails to receive a heartbeat from the second process on any of the multiple independent networks, the second process is suspected of failing.

The methods of the present invention include steps that may be performed by computer-executable instructions executing on a computer-readable medium.

The present invention provides low cost simplistic techniques for detecting network and process failures in a distributed system. Accordingly, corrective action may be taken when failures are detected. Therefore, down-time for a service provided by the processes in the distributed system may be minimized. Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
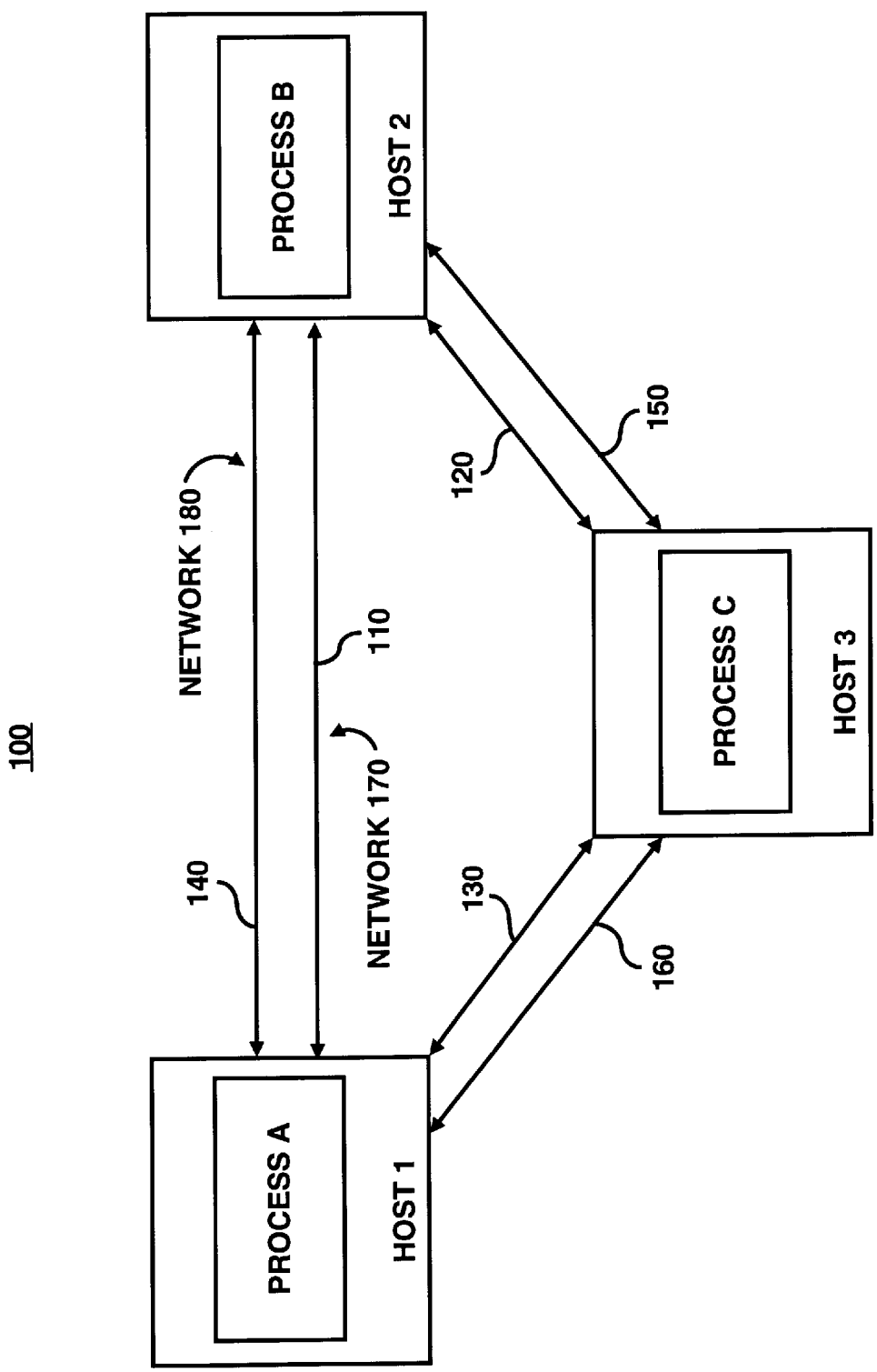
FIG. 1 illustrates an exemplary block diagram of a distributed system employing the principles of the present invention.

FIG. 1 shows distributed system 100 employing the principles of the present invention. Distributed system 100 includes host 1, host 2 and host 3 executing process A, process B and process C, respectively. Processes A–C function to provide a service to a plurality of users via distributed system 100. Hosts 1–3 are connected via bi-directional communication paths 110–160. Communication paths 110–160 include, for example, network links in multiple independent networks. For example, paths 110–130 are included in network 170 and paths 140–160 are included in network 180. Hosts 1–3 are typical nodes in a distributed system and can include a data processing system, memory and network interface, not shown. It will be apparent to those of ordinary skill in the art that an arbitrary number of hosts in distributed system 100 may be supported in an arbitrary configuration. Furthermore, each host may execute one or more processes.

An administration function performed by distributed system 100 can include detecting failure of one or more of processes A–C, such that corrective action (e.g., eliminating and/or replacing a failed process) can be taken when a process fails. For example, a failed process may be removed from a "view", when a consensus is reached that the process has failed. Accordingly, processes A–C, executing on hosts 1–3 respectively, transmit heartbeats on communication paths 110–160 to detect a process failure. For example, process A monitors process B by monitoring heartbeats transmitted on communication paths 110 and 140 from process B. Process A may utilize a network failure algorithm for detecting a failure of a network in system 100. The network failure algorithm includes comparing the difference between a period of time for process A to receive a heartbeat from process B on network 170 and a period of time to receive a heartbeat from process B on network 180. If the difference exceeds a network failure threshold, network 180 is suspected of failing. The network failure threshold may be a predetermined threshold or a threshold that can automatically adapt to varying network conditions. It will be apparent to one of ordinary skill in the art that the threshold may be determined based upon the network configuration, average network traffic and/or other factors relevant to network transmission.

A network failure may include a network condition that prevents communication on the network for a predetermined period of time. For example, a network failure may include a network pause (i.e., a temporary condition that prevents communication on a network) or a less temporary network failure, such as a hardware failure for hardware facilitating transmission on the network. A network pause, for example, can be the result of heavy, high priority traffic over a network link, sometimes caused by other processes (e.g., remote machine backups).

System 100 may also detect failure of a process (e.g., processes A–C) using a process failure algorithm, such as determining whether a heartbeat is received from any process in system 100 prior to expiration of a process failure time limit. For example, process A monitors process B by monitoring heartbeats transmitted on networks 170 and 180. If process A fails to receive a heartbeat from process B on any one networks 170 and 180 within a process failure time limit, process B is suspected of failing. Similarly to the network failure threshold, the process failure time limit may be predetermined or adaptive. It will be apparent to one of ordinary skill in the art that the time limit may be determined based upon the network configuration, average network traffic and other factors relevant to network transmission.

Based on the monitoring of processes and networks in system 100, appropriate corrective action may be taken. For example, when process A determines that process B failed, process A can eliminate and/or replace process B. Alternatively, when process A determines that a network failure has occurred, process A may take a different action, such as waiting for a condition causing a network pause to clear or attempting to establish new communication path(s) over a different network or alternative paths within network 150.

Figure 2:
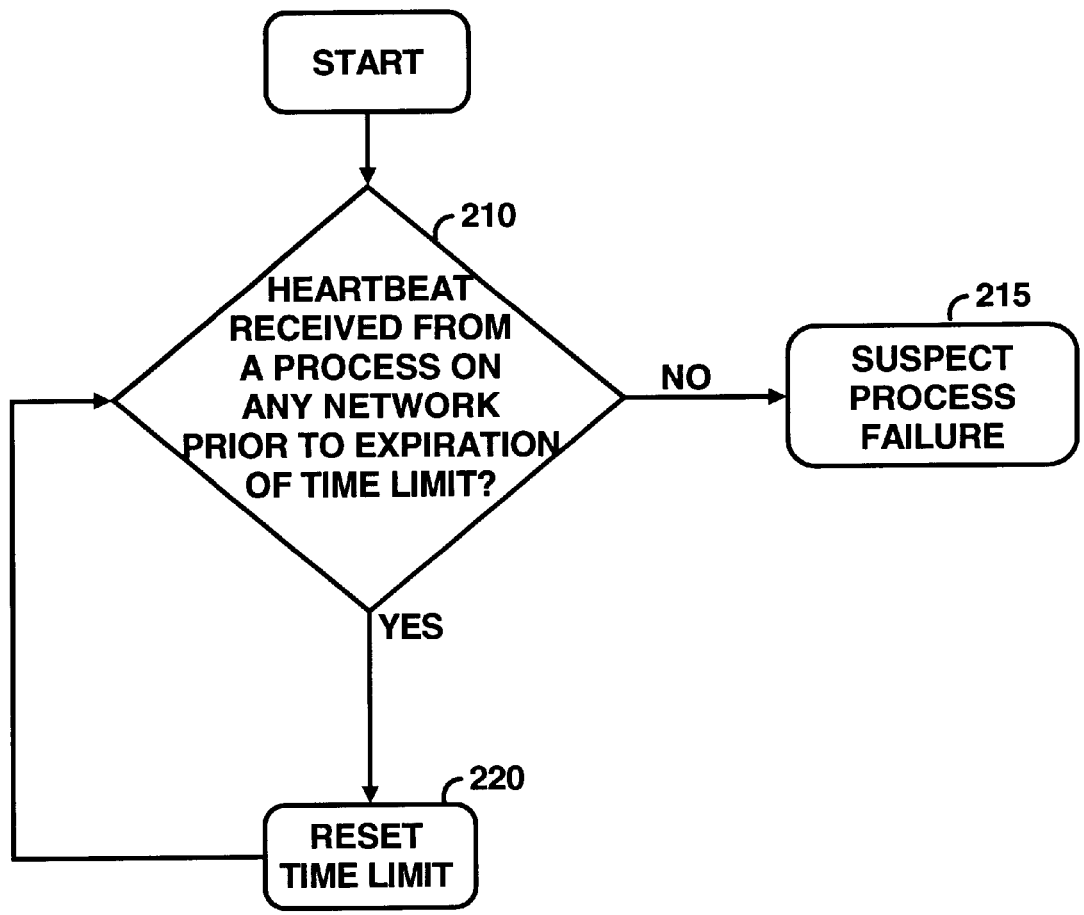
FIG. 2 illustrates a flow-diagram of an exemplary embodiment of a method employing the principles of the present invention.

A flow-diagram, shown in FIG. 2, illustrates an exemplary embodiment of a method 200 implementing the process failure algorithm of the present invention in a distributed system. The steps shown in FIG. 2 are described with respect to processes A–C in distributed system 100. It will be apparent to one of ordinary skill in the art, however, that the method shown in FIG. 2 is applicable to distributed systems having a variety of configurations and having a process monitoring more than two processes.

In step 210, process A monitors another process (e.g., process B) in system 100. Process A determines whether a heartbeat is received from process B on any of networks 170 or 180 prior to the expiration of the process failure time limit. If a heartbeat is not received prior to the expiration of the process failure time limit, process B is suspected to have failed and appropriate corrective action may be taken (step 215). If a heartbeat is received prior to the expiration of the process failure time limit, the process failure time limit is reset (step 220). Then, method 200 is repeated.

Figure 3:
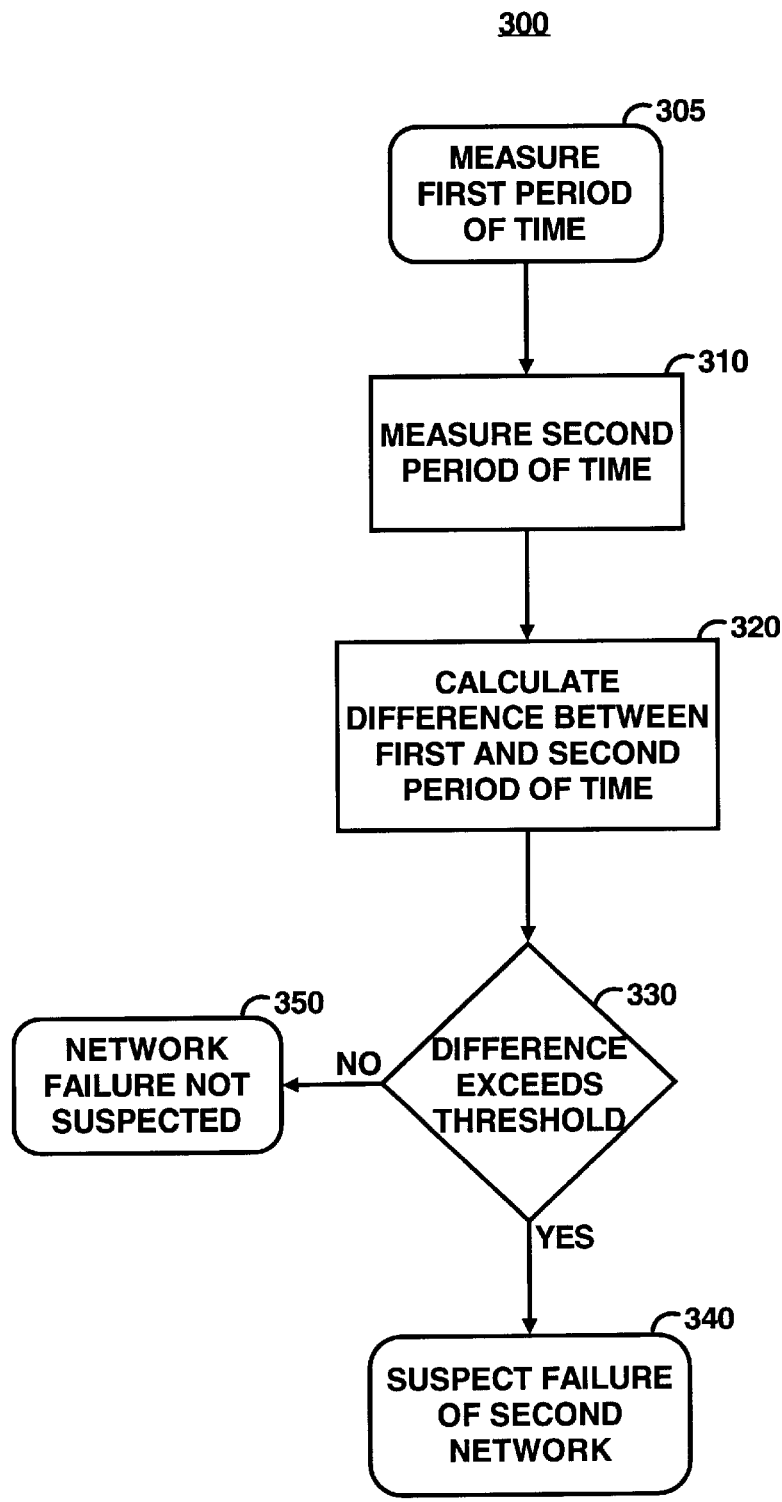
FIG. 3 illustrates a flow-diagram of another exemplary embodiment of a method employing the principles of the present invention.

A flow-diagram, shown in FIG. 3, illustrates an exemplary embodiment of a method 300 including the steps of the network failure algorithm of the present invention. The steps shown in FIG. 3 are described with respect to processes A–C in distributed system 100. It will be apparent to one of ordinary skill in the art that the method shown in FIG. 3 is applicable to distributed systems having a variety of configurations and having a process monitoring more than two networks. Also, it will be apparent to one of ordinary skill in the art that the network failure algorithms may be implemented using a plurality of techniques.

In step 305, a first period of time between an instance a last heartbeat was received from a first process (e.g., process B) on a first network (e.g., network 170) and a later instance in time is measured. In step 310, a second period of time between an instance a last heartbeat was received from the first process (e.g., process B) on a second network (e.g., network 180) and the later instance in time is measured. In step 320, the difference between the first and second periods of time is calculated. In step 330, the difference is compared to the network failure threshold. If the difference exceeds the network failure threshold, the second network is suspected of failing (step 340), and appropriate corrective action may be taken. If the difference does not exceed the network failure threshold, a failure of the second network is not suspected (step 350).

Figure 4:
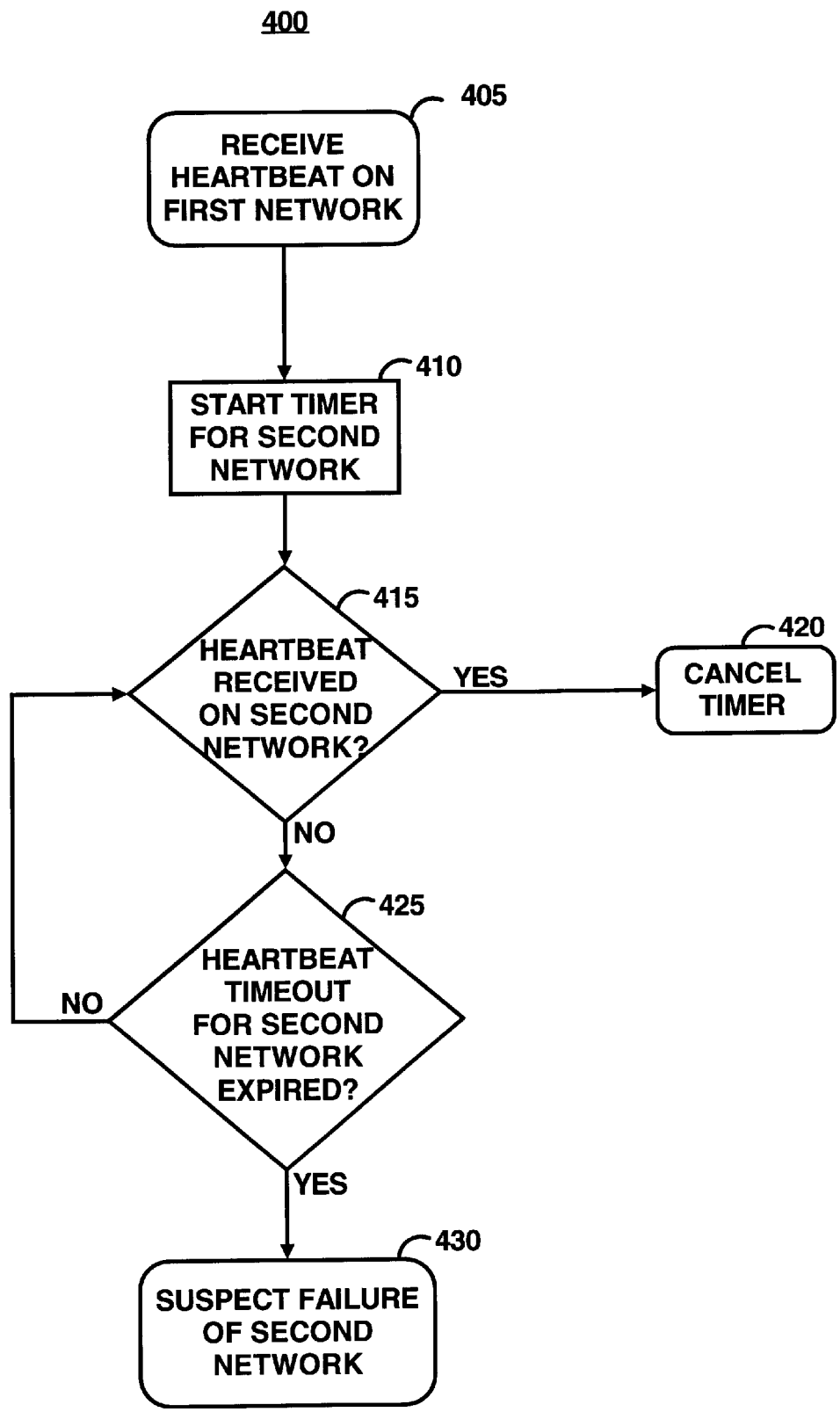
FIG. 4 illustrates a flow-diagram of another exemplary embodiment of a method employing the principles of the present invention.

A flow-diagram, shown in FIG. 4, illustrates an exemplary embodiment of a method 400 implementing the network failure algorithm of the present invention in a distributed system. The steps shown in FIG. 4 are described with respect to processes A–C in distributed system 100. It will be apparent to one of ordinary skill in the art, however, that the method shown in FIG. 4 is applicable to distributed systems having a variety of configurations and having a process monitoring more than two processes.

In step 405, process A receives a heartbeat from a process (e.g., process B in system 100) on a first network (e.g., network 170). In step 410, a timer is started for detecting a heartbeat timeout of a second network (e.g., network 180) connecting processes A and B. In step 415, process A determines whether a heartbeat is received from process B on network 180. If a heartbeat is received on network 180 from process B, the timer is cancelled (step 420). If a heartbeat is not received from process B on network 180, process A determines whether the heartbeat timeout for network 180 is expired (step 425). The heartbeat timeout may be predetermined or adaptive, similar to the network failure threshold. An adaptive heartbeat timeout technique is described in co-pending U.S. patent application Ser. No. 09/833,572, entitled Adaptive Heartbeats and incorporated by reference herein. It will be apparent to one of ordinary skill in the art that a predetermined heartbeat timeout may be determined based upon the network configuration, average network traffic and other factors relevant to network transmission.

If the heartbeat timeout is expired, process A suspects a failure of network 180 (step 430), and process A may take appropriate corrective action. If the heartbeat timeout is not expired, process A determines whether a heartbeat is received from process B on network 180 (step 415).

The methods shown in FIGS. 2–4 detect process and network failures. Accordingly, corrective actions tailored to the type of failure detected can be taken to reach a timely solution. Thus, down-time is limited for service(s) facilitated by processes executing in a distributed system.

The methods shown in FIGS. 2–4 and described above can be performed by a computer program. The computer program can exist in a variety of forms both active and inactive. For example, the computer program can exist as software possessing program instructions or statements in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

Also, the methods shown in FIGS. 2–4 and described above may be performed by a process facilitating a service, such as process A in distributed system 100, or performed by a separate process executed on a host in a distributed system.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of detecting a network failure in a distributed system, the method comprising steps of:
   (1) measuring a first period of time between an instance a last heartbeat was received from a process on a first network and a later instance in time;
   (2) measuring a second period of time between an instance a last heartbeat was received from said process on a second network and said later instance in time;
   (3) comparing said first and second periods of time with a predetermined threshold; and
   (4) determining whether a network failure occurred in response to said comparison in step (3).

2. The method of claim 1, wherein step (3) further comprises steps of:
   calculating a difference between said first period of time and said second period of time; and
   comparing said difference to said predetermined threshold.

3. The method of claim 2, wherein said step (4) further comprises steps of:
   detecting a failure of said second network in response to said difference equaling or exceeding said predetermined threshold.

4. The method of claim 1, wherein said steps are performed as computer-executable instructions on a computer-readable medium.

5. A method of detecting a process failure in a distributed system, the method comprising steps of:
   (1) arranging for a process executing on a first host to generate heartbeats and to apply them to each of at least two networks;
   (2) determining whether a heartbeat is received over at least one of said networks from said process in the distributed system prior to an expiration of a heartbeat timeout; and
   (3) detecting a failure of said process in response to not receiving a heartbeat over at least one of said networks prior to said expiration of said heartbeat timeout.

6. The method of claim 5, wherein said steps are preformed as computer-executable instructions on a computer-readable medium.

7. The method of claim 6, further comprising steps of:
   (4) if at least one heartbeat is received, determining whether a heartbeat is received over all of said networks; and
   (5) detecting a failure of at least one of said networks in response to not receiving a heartbeat over at least one of said networks.

8. A distributed system including a plurality of hosts connected via a plurality of networks, wherein each host executes a process in said distributed system, said system comprising:
   a first host of said plurality of hosts executing a first process;
   a second host of said plurality of hosts executing a second process, said second host being connected to said first host via at least two networks, and said second process sending out heartbeats over at least two of said at least two networks receivable by said first process;
   wherein said first process is operable to detect one of failure of said second process and failure of a first network of said at least two networks, detection of failure of said second process being based on expiration of a period of time without reception of any heartbeats transmitted from said second process, and failure of said first network being based on expiration of a period of time with reception of at least one heartbeat transmitted over one of said at least two networks but without reception of any heartbeats transmitted from said second process over said first network.

9. The system of claim 8, wherein said first host is operable to measure a first period of time between an instance when a last heartbeat was received from said second host on a second of said at least two networks and a later instance in time and to measure a second period of time between an instance when a last heartbeat was received from said second host on said first network and said later instance in time; and said first host is further operable to compare said first and second periods of time with a predetermined threshold, and detect a failure of said first network in response to said comparison.

10. The system of claim 9, wherein said first host is further operable to calculate a difference between said first period of time and said second period of time, and compare said difference to said predetermined threshold.

11. The system of claim 10, wherein said first host is operable to detect said failure of said first network in response to said difference exceeding said predetermined threshold.

12. The system of claim 8, wherein said first host is operable to determine whether a heartbeat is received from said second host on any of said at least two networks prior to an expiration of a heartbeat timeout.

13. The system of claim 12, wherein said first host is further operable to detect said failure of said second process executing on said second host in response to not receiving the heartbeat from said second host prior to said expiration of said heartbeat timeout.

14. The system of claim 13, wherein said first process is operable to remove said second process from a view in response to detecting said failure of said second process.

15. A method of detecting a network failure in a distributed system, the method comprising steps of:

(1) measuring a first period of time between an instance a last heartbeat was received from a process on a first network and a later instance in time;

(2) measuring a second period of time between an instance a last heartbeat was received from said process on a second network and said later instance in time;

(3) comparing said first and second periods of time with a predetermined threshold, this comparing step further comprising the steps of
calculating a difference between said first period of time and said second period of time, and
comparing said difference to said predetermined threshold; and (4) determining whether a network failure occurred in response to said comparison in step (3).

16. The method of claim 15, wherein said step (4) further comprises steps of:

detecting a failure of said second network in response to said difference exceeding said predetermined threshold.

17. A distributed system including a plurality of hosts connected via a plurality of networks, wherein each host executes a process in said distributed system, said system comprising:

a first host of said plurality of hosts executing a first process; and a second host of said plurality of hosts executing a second process, said second host being connected to said first host via at least two networks; wherein said first process is operable to detect one of failure of said second process and a failure of a first network of said at least two networks based on expiration of a period of time without reception of a heartbeat transmitted from said second process, to measure a first period of time between an instance when a last heartbeat was received from said second host on a second of said at least two networks and a later instance in time and to measure a second period of time between an instance when a last heartbeat was received from said second host on said first network and said later instance in time, to compare said first and second periods of time with a predetermined threshold, and detect a failure of said first network in response to said comparison, and to calculate a difference between said first period of time and said second period of time, and compare said difference to said predetermined threshold.

18. The system of claim 17, wherein said first host is operable to detect said failure of said first network in response to said difference exceeding said predetermined threshold.

19. A distributed system including a plurality of hosts connected via a plurality of networks, wherein each host executes a process in said distributed system, said system comprising:

a first host of said plurality of hosts executing a first process;

a second host of said plurality of hosts executing a second process, said second host being connected to said first host via at least two networks; and wherein said first host is operable to detect one of failure of said second process and a failure of a first network of said at least two networks based on expiration of a period of time without reception of a heartbeat transmitted from said second process, and to determine whether a heartbeat is received from said second host on any of said at least two networks prior to an expiration of a heartbeat timeout.

20. The system of claim 19, wherein said first host is further operable to detect said failure of said second process executing on said second host in response to not receiving a heartbeat from said second host prior to said expiration of said heartbeat timeout.

21. The system of claim 20, wherein said first process is operable to remove said second process from a view in response to detecting said failure of said second process.

* * * * *